No. 889,138. PATENTED MAY 26, 1908.
J. A. LAMONT.
LOCKING DEVICE.
APPLICATION FILED MAR. 27, 1905. RENEWED AUG. 30, 1907.
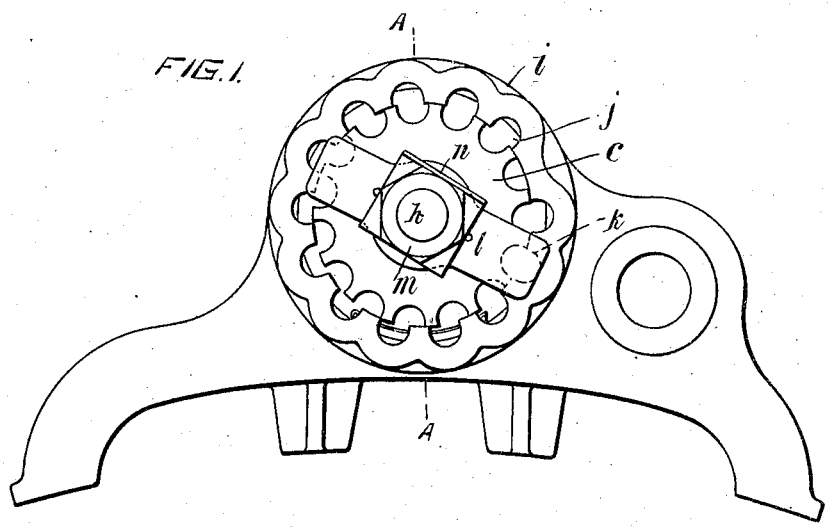
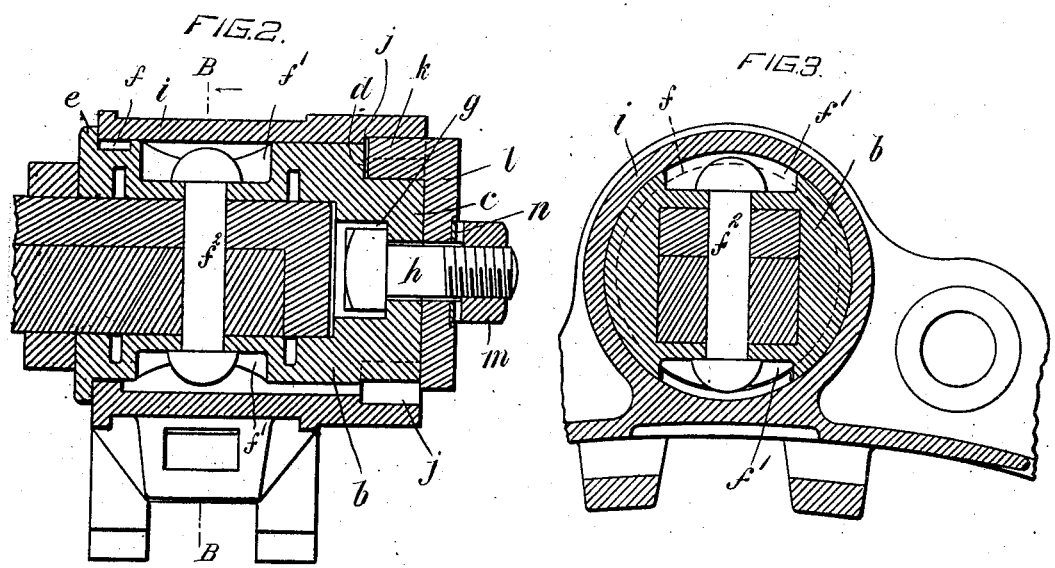
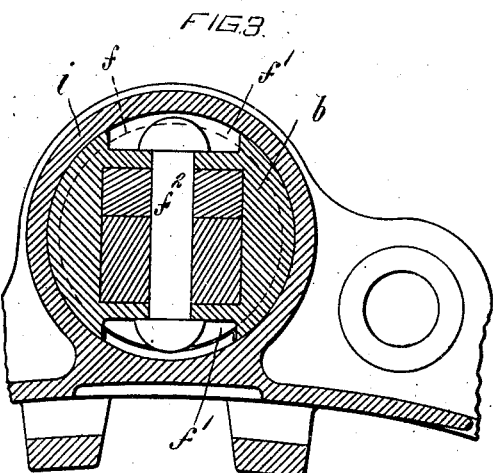
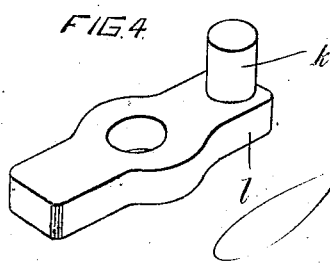

UNITED STATES PATENT OFFICE.

JOHN ALEXANDER LAMONT, OF MONTREAL, QUEBEC, CANADA, ASSIGNOR TO SIMPLEX RAILWAY APPLIANCE COMPANY, OF CHICAGO, ILLINOIS.

LOCKING DEVICE.

No. 889,138.  Specification of Letters Patent.  Patented May 26, 1908.

Application filed March 27, 1905, Serial No. 252,246.  Renewed August 30, 1907.  Serial No. 390,823.

*To all whom it may concern:*

Be it known that I, JOHN ALEXANDER LAMONT, of the city of Montreal, Province of Quebec, Canada, have invented certain new and useful Improvements in Locking Devices; and I do hereby declare that the following is a full, clear, and exact description of the same.

My invention relates particularly to locking devices of the type disclosed in Patent 849,183, granted April 2, 1907, to William Stephen Atwood, and it has for its object to provide a locking device of this type the locking parts proper whereof will be permanently secured together.

The invention may be said briefly to consist of a locking member carried by one of the parts to be locked together, a second locking member carried by the other of such parts, and a device carried permanently by one of such parts and adapted to co-act with the locking members and lock the parts in any predetermined positions relatively to one another.

For full comprehension, however, of my invention reference must be had to the accompanying drawings forming a part of this specification, in which similar reference characters indicate the same parts and wherein Figure 1 is a side elevation illustrating a brake head secured to a brake beam according to my invention; Fig. 2 is a transverse sectional view taken on line A. A. Fig. 1 with the device for locking the parts in the positions to which they are moved, in a different angular position to that in which it is shown in Fig. 1; Fig. 3 is a transverse sectional view of the device taken on line B. B. Fig. 2; and Fig. 4 is a detail perspective view of the oscillatory bar and key carried thereby.

I have illustrated and will describe in detail my invention applied to the adjustable connection of a brake head to a brake beam although it is to be understood that my device can be applied with advantage to almost any case requiring the adjustable connection of parts, and without departing from the spirit of my invention.

The member carried by the brake beam consists of a sleeve $b$ cast with one end diminished as at $c$ and rounded concentrically to such sleeve, and the periphery of such rounded portion is formed with a series of uniformly spaced axial recesses $d$; while the opposite end of the member is formed with a circumferential flange $e$, and a perimetrical recess $f$, the remainder of the perimeter being smooth excepting for a pair of diametrically opposite recesses $f'$ which accommodate the head and nut of the bolt $f^2$ securing the member to the brake beam. The interior of this member is cored out to present a socket $g$ for the head of a bolt $h$ which projects through a hole in the end of the member concentrically thereto and affords a means for connecting a portion of the locking device against complete displacement from the member.

The member of my device which constitutes an integral part of the brake shoe head or holder is of cylindrical form $i$, having in its interior a uniformly spaced series of axial recesses $j$, the spaces between which are greater than the spaces separating the recesses $d$.

The member upon the brake-shoe and the member upon the brake-beam, and consequently such parts themselves, are locked against movement relatively to one another by a key $k$ carried by a perforated bar $l$ pivoted upon the protruding end of the bolt $h$, while a nut $m$ serves as a means for retaining the key in its locking position in the socket presented by a registering pair of the recesses $d$ and $j$, and a nut lock $n$ prevents accidental displacement of the nut.

In changing the angular position of the brake-shoe the nut $m$ is loosened sufficiently to allow the key $k$ to be withdrawn from the socket in which it is located. The shoe can then be moved to the required angular position and the key inserted in the socket presented by whichever pair of the recesses $d$ and $j$ then register.

I do not claim broadly the idea of locking a brake head to a brake beam by means of a pair of members one upon the beam and the other upon the head, each member presenting a series of devices whereby the head can be adjustably connected to the beam, the devices of one member being disposed a distance apart different from the distance between the devices of the other member, as the said broad idea forms the subject matter of Patent 849,183, granted April 2, 1907, to William Stephen Atwood.

What I claim is as follows:—

1. A pair of members each constructed to present a series of devices whereby such members can be adjustably connected together the devices of one series being disposed at a distance apart different from the distance separating the devices of the other series and means coacting with such members and carried permanently by one of them for locking the said members against displacement relatively to one another.

2. The combination with a pair of parts, of means adjustably connecting such parts together consisting of a pair of members carried by such parts and adjacent to one another, each member having a series of recesses and means carried permanently by one of the parts and adapted to engage a coinciding pair of recesses whereby such parts can be adjustably connected together, the recesses of one series being disposed a distance apart different from the distance separating the recesses of the other series.

3. The combination with a brake beam and a brake head carried thereby of a member carried by the brake beam and a second member upon the brake head, each of such members being constructed to present a series of devices whereby the brake head can be secured in different angular positions upon the brake beam, the devices of one series being disposed a distance apart different from the distance separating the devices of the other series, and means coacting with such members and carried permanently by one of them for locking the said members against displacement relatively to one another.

4. The combination with a brake beam and a brake head carried thereby, of a member carried by the brake beam and a second member upon the brake head, such members being adapted to lie adjacent to one another and each of such members having a series of devices, a part carried movably by one of the members, a key carried by such part and adapted to engage a coinciding pair of such devices whereby the brake head can be secured in different angular positions upon the brake beam, the devices of one series being disposed at a distance apart different from the distance separating the devices of the other series.

5. The combination with a brake beam and a brake head carried thereby and constructed with a hollow cylindrical part the interior whereof has a regularly disposed series of devices, of a sleeve carried by the brake beam and fitting rotatably within the cylindrical part of the head, such sleeve having a circular portion formed within a series of equi-distant devices disposed a distance apart different from the distance separating the devices of the head, and adjustable means carried by one of the brake members and adapted to coact with the two series of devices for the purpose of securing the brake head in different angular positions upon the brake beam.

6. The combination with a brake beam and a brake head carried thereby and constructed with a hollow cylindrical part one end of the interior whereof has a regularly disposed series of axially extending recesses, of a sleeve carried by the brake beam and fitting rotatably within the cylindrical part of the head such sleeve having the exterior of one end diminished and formed with a series of equi-distant axial recesses disposed a distance apart different from the distance separating the recesses of the head, a bar pivoted concentrically to the diminished end of the sleeve, and a key formed integrally with such bar and adapted to be inserted into a coinciding pair of such recesses whereby the brake head can be secured in different angular positions upon the brake beam, and means for locking the bar against accidental displacement.

7. The combination with a brake beam and a brake head carried thereby and constructed with a hollow cylindrical part one end of the interior whereof has a regularly spaced series of axial recesses, of a sleeve carried by the brake beam and fitting into the cylindrical part of the head and constructed to present an annular series of recesses in the same radial plane as the recesses of the head, the end of such sleeve being closed and formed with a hole concentrically to the last mentioned annular series of recesses; a bolt having its head within the sleeve and its shank projecting through the hole in the end thereof; a bar pivoted upon the protruding end of the bolt and having a key secured rigidly thereto and adapted to fit into a registering pair of the coinciding recesses; and a nut screwed upon the bolt for the purpose of removably retaining the key in locking position.

8. The combination with a brake beam and a brake head carried thereby and constructed with a hollow cylindrical part one end of the interior whereof has a regularly spaced series of axial recesses, of a sleeve carried by the brake beam and fitting into the cylindrical part of the head and constructed to present an annular series of recesses in the same radial plane as the recesses of the head, the interior of the end of such sleeve being diminished to present a hole concentric to the last mentioned annular series of recesses; a bolt having its head within the sleeve and its shank projecting through the hole in the end thereof; a bar pivoted upon the protruding end of the bolt and having a key secured rigidly thereto and adapted to fit into a registering pair of the coinciding recesses; a nut screwed upon the bolt for the purpose of removably retaining the key in locking position, and a nut lock.

In testimony whereof, I have signed my name to this specification, in the presence of two subscribing witnesses.

JOHN ALEXANDER LAMONT.

Witnesses:
WILLIAM P. McFEAT,
FRED. J. SEARS.